Oct. 26, 1937.　　　D. F. TAYLOR　　　2,097,001
METHOD OF MAKING MULTIFOCAL LENS
Filed May 8, 1933　　　2 Sheets-Sheet 1
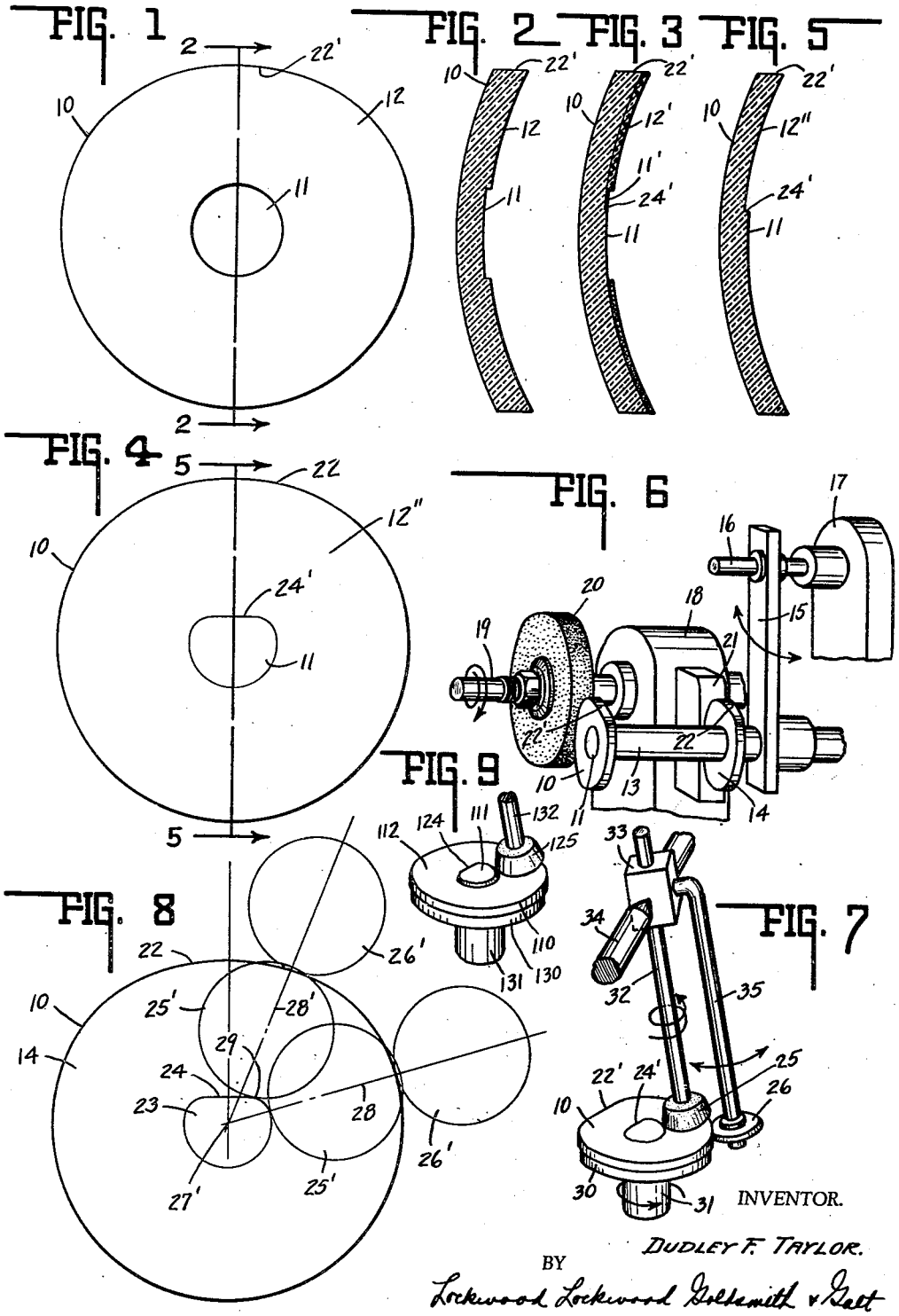
INVENTOR.
DUDLEY F. TAYLOR.
BY Lockwood Lockwood Goldsmith & Galt
ATTORNEYS.

Oct. 26, 1937.                D. F. TAYLOR                 2,097,001
                    METHOD OF MAKING MULTIFOCAL LENS
                        Filed May 8, 1933           2 Sheets-Sheet 2
FIG. 10     FIG. 11  FIG. 12     FIG. 13
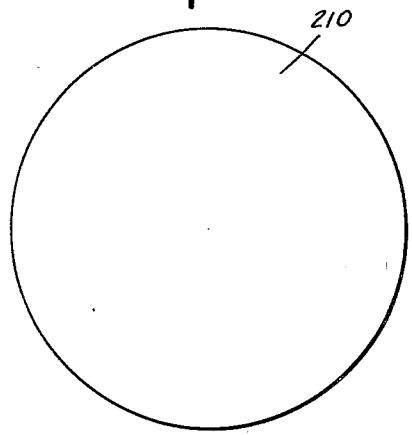
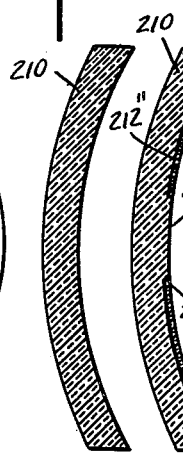
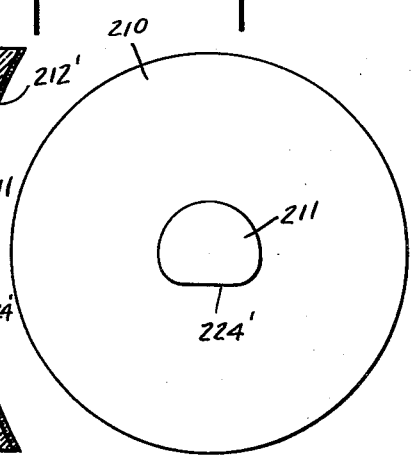
FIG. 14
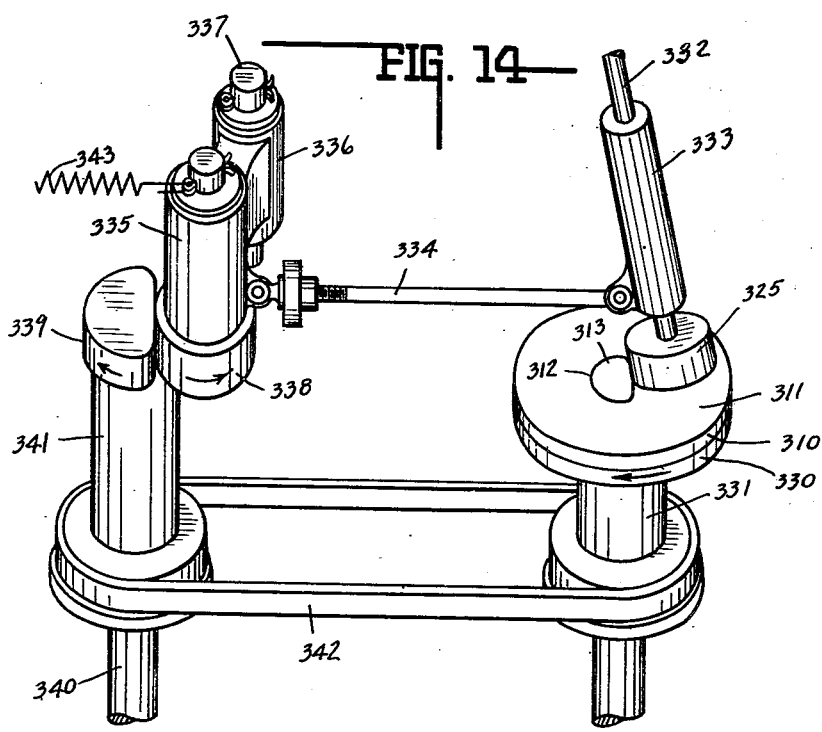
INVENTOR.
DUDLEY F. TAYLOR.
BY
Lockwood Lockwood Goldsmith & Galt
ATTORNEYS.

Patented Oct. 26, 1937

2,097,001

UNITED STATES PATENT OFFICE 2,097,001

METHOD OF MAKING MULTIFOCAL LENS

Dudley F. Taylor, Indianapolis, Ind., assignor to Continental Optical Company Inc., Indianapolis, Ind., a corporation Application May 8, 1933, Serial No. 669,924

13 Claims. (Cl. 51—278)

This invention relates to an improved method in the making of a multifocal opthalmic lens or blank, reference being had to Letters Patent Nos. 1,843,758 and 1,869,461, issued February 2, 1932 and August 2, 1932 to Lucian W. Bugbee, Jr. for Process of making multifocal lens and Multifocal lens, respectively.

Wherein the lens of the latter patent is made by the process disclosed in the former patent, the distance vision field is first ground with a circular inner boundary, and thereafter a portion of the near vision field is ground away to conform to the curvature of the distance vision field. Thus, in the process employed therein, the near vision field of the lens is first generated and the surrounding concentric distance vision field is then generated, after which a part of the near vision field is ground away to a curvature coincident with the curvature of the distance vision field.

It is the object of this invention to produce a multifocal lens or lens blank having a non-circular vision field surrounded by the inner boundary line of a vision field of different power. By the method disclosed herein, the outer vision field is generated to the prescribed curvature with a non-circular inside boundary line conforming to the desired shape of the inner field. This is accomplished by means of a tool guided by a cam over such path as to give the desired shape to said boundary line. The inner vision field may be produced either before or after the outer vision field has been generated, and entirely independent thereof. Thus, the entire outer vision field is generated irrespective of the curvature or shape of the non-circular inner boundary line separating it from the inner vision field.

A further object of the invention resides in the apparatus and method of generating a multifocal lens or lens blank as above set forth by the employment of a cam for automatically guiding the surface generating or grinding button in a path conforming with the non-circular inside boundary line of the outer vision field.

The employment of the cam for guiding the grinding button may be accomplished in several different ways, some of which are illustrated herein. The lens blank may have its peripheral edge ground into a cam-like shape so that the lens itself constitutes the required cam; the holder for the lens blank may have a cam-like periphery serving the same purpose; a cam button may be cemented on the face of the lens conforming in outline to the finished near vision field, or similar remote cam members may be employed for guiding the movement of the grinding button.

Other objects and features of this invention will be more fully understood from the accompanying drawings and the following description and claims:

Figure 1 is a plan view of a lens blank before the outer vision field is ground but with a circular inner vision field ground therein, the blank having its peripheral edge formed as a cam. Figure 2 is a section taken on the line 2—2 of Figure 1. Figure 3 is the same as Figure 2 showing the section of the outer and inner vision fields to be ground away. Figure 4 is the same as Figure 1 showing the finished blank. Figure 5 is a section taken on the line 5—5 of Figure 4. Figure 6 illustrates diagrammatically an apparatus for forming the cam-like periphery on the lens blank. Figure 7 diagrammatically illustrates the application of the grinding button to the lens blank with the follower wheel engaging the peripheral cam for guiding the same over the surface to be generated. Figure 8 is a diagrammatic illustration of the method of outlining the peripheral cam surface to be ground about the lens or holder to produce an outer field with an inner boundary line of the shape illustrated. Figure 9 is a perspective view of a lens with a cam button thereon illustrating a modified form of employing a cam. Figures 10 to 13, inclusive, are illustrative of a modified form of lens blank. Figure 14 is a diagrammatical illustration of a modified type of cam control for the generating tool.

In the drawings, there is shown a lens blank 10 having an inner or a near vision field 11 and an outer concentric surface 12. Said blank is mounted on a spindle 13 (Fig. 6) on which a master cam 14 is mounted in spaced relation thereto. The spindle 13 is supported upon a swinging arm 15 pivotally suspended from the shaft 16 supported on the bracket 17. Adjacent thereto there is a housing 18 enclosing a motor, pulley or other means of driving power for driving the shaft 19 upon which the grinding wheel 20 is secured. On the housing 18 there is a hardened cam block 21 which is engaged by the master cam 14. The master cam 14 has a semi-circular periphery and a flattened periphery indicated at 22 so that its peripheral shape is exactly that of the shape to be formed upon the periphery of the lens blank 10. By means of this device, assuming that the cam 14 is yieldingly held against the cam block 21 by a suitable spring or gravity, and upon rotation of the spindle 13 by any suitable means well known in the art but not illustrated herein, the periphery of the blank 10 is ground by the grinding wheel 20 to the curvature of the master cam 14, thereby producing on the blank a flattened peripheral portion 22'.

As illustrated in Figure 8, the flattened portion 22 of the cam or the like portion 22' of the blank is generated in accordance with the outline of the inner boundary line of the outer or distance vision field of the lens as indicated at 12'', said line being semi-circular about the lower boundary and flattened along the upper boundary as indicated at 24. Assuming that the grinding button 25 is represented by the circle 25' and the follower wheel 26 is represented by the circle 26' (Figs. 7 and 8), said button oscillating from a center indicated in Figure 8 at 27', and that said button and wheel are maintained with their centers on the radial line 28, then throughout the semi-circular portion of the boundary line the point of tangency therewith of the grinding button will be on the radial line 28. But when the button moves over the flattened portion 24, the point of tangency, or the grinding point 29, lags behind the radial line 28' through their centers. By reason thereof, the flattened periphery 22 of the cam 14 is of a different curvature than the flattened portion 24, being more rounded and less flat. Thus said portion 22 may be generated by moving a pattern as illustrated in Figure 8 about the periphery and noting the line of curvature taken by the point of tangency between the inner periphery of the circle 26' and the various radial lines 28 and 28', maintaining the circle 25' in constant relation therewith and tangent to the outline of the surface 23.

Having ground the blank by the means illustrated in Figure 6 to the peripheral form in accordance with the master cam 14 and as illustrated in Figure 8, said blank may then be placed upon the lens holder 30 which is mounted upon and driven by the spindle 31 in any suitable manner that is well known in the art. The grinding button 25 is mounted on the shaft 32 extending through the block 33 and rotated as indicated by the arrows in a manner well understood, said block being pivotally supported by the arms 34. Rigidly secured to the block 33 and projecting downwardly parallel with the shaft 32 there is an arm 35 which carries the follower wheel 26, the axis of rotation of both the grinding button and follower wheel being rigidly maintained in alignment with each other on a radial line through the center of the blank (see Fig. 8). The follower wheel may engage either the peripheral surface of the blank if formed to the proper curvature as illustrated in Figure 6, or it may follow the peripheral surface of the holder 30, provided said holder has been formed to the proper curvature.

As the blank is rotated, the surface engaged by the button 25 will be ground away, said button being guided in its movement over said surface by the follower 26 engaging the cam-like periphery. Thus, as the follower approaches the flattened portion 22' the button will move inwardly to follow the inner boundary line 24' of the distance vision field.

As illustrated in Figure 3 by the heavy sectional lines, the section of the distance vision field of the lens indicated thereby as 12' is ground away to its inner boundary line, including the thinner portion 11' of the near vision field 11. This results in the finished lens blank illustrated in Figures 4 and 5 wherein the entire finished distance vision field 12'' is ground down to merge with the near vision field 11 about a portion of said inner boundary line 24' which separates the two fields.

As illustrated in Figure 9, an annular blank 110 is placed on an annular holder 130 mounted for rotation upon the spindle 131, said blank having a cam button 111 cemented thereon within the inner boundary line of the distance vision field and of the desired outline thereof provided with the flattened surface 124. Thereupon, the grinding button 125 mounted upon the spindle 132 may be operated to engage and generate the distance vision field 112 of the blank 110, suitable means being provided as well understood in the art, for moving the grinding button about the surface and against the outline of the cam button 111. Said cam button will guide the movement of the grinding button so that the distance vision field will be generated to conform with the desired curvature of its inner boundary line, after which action the cam button is removed.

From the above it will be understood that by means of what may be called a "cam method" in the production of multifocal lenses of this character, the entire distance vision field of the lens is generated to the desired or finished curvature with a non-circular inner boundary line, thus avoiding the necessity of first generating the distance curvature to a circular boundary line and thereafter generating said curvature with a non-circular or flattened inner boundary line.

While the invention has been specifically described and illustrated in connection with a multifocal lens having its inner portion generated to a curvature to provide a near vision field, and its outer portion generated to the prescribed curvature for distance vision field, this arrangement may be reversed wherein the distance vision field comprises the inner portion and the near vision field the outer or surrounding portion.

Reference has also been made herein to a generating button or tool for generating the surface of the field to the prescribed curvature, whether by grinding, polishing or both. Any further polishing in addition to that effected in the generating operation may take place in any number of ways as is well known to those skilled in the art.

While the above is descriptive of the method as applied to a blank having a recessed near vision field, it is equally applicable to other types of blanks, such as illustrated in Figures 10 to 13, inclusive. Figure 10 is a plan view of a rough blank 210 having only one surface curvature and without the near vision field being generated therein. This may be a molded blank or rough ground to the approximate curvature and circular in outline. The blank may be placed upon a suitable holder such as the holder 330 illustrated in Figure 14 and the portion shown in heavy section and indicated by 212' in Figure 12 ground away to generate a distance vision field of the desired curvature indicated at 212'', the inner boundary of said field conforming to the characteristics of a master cam so as to leave a central portion 211, as shown in Figures 12 and 13, which, in this instance, would project or protrude from the surface of the lens with a surrounding shoulder, the upper portion of which is semi-circular and the lower portion flattened, as indicated at 224'. Thus a blank is produced having a substantially finished distance vision field of the proper curvature and with the desired inner boundary line surrounding the central portion of the blank which may be thereafter generated to provide a near vision field.

In the same manner, an ordinary type of one-piece bifocal lens blank having a circular near vision field may be employed. Such near vision field may be finished or only rough ground. In accordance with the above described method, a new distance vision field may be generated about the outer portion of the blank and with its inner boundary surrounding the near vision field conforming to a non-circular outline in accordance with the curvature of the cam employed. By this method, a part of the original near vision field will be simultaneously removed, which may or may not leave a slight shoulder extending about the entire inner boundary line.

Another means of employing a cam for accomplishing the above is diagrammatically illustrated in the modified form of Figure 14 wherein there is shown a blank 310 having a distance vision field 311 with an inner boundary line 312 surrounding the near vision field 313. Said blank is mounted upon a holder 330 rotated by the spindle 331 in the direction indicated by the arrow. A grinding or polishing button 325 is employed to generate the desired curvature of the distance vision field, said button being rotated in the usual manner by the shaft 332 supported in the bearing 333. The bearing 333 is connected by the rod 334 with the collar 335 linked to the collar 336 pivotally mounted upon the supporting pin 337. The collar 335 has a roller 338 pivotally mounted thereon and adapted to be engaged by the master cam 339. The master cam is secured to and rotated by the shaft 340 supported in the bearing 341. The shafts 340 and 331 are driven at the same speed by the chain or belt 342. A suitable spring 343 or the like is employed to hold the roller 338 in contact with the cam. By this means, if the lens blank is rotated at the same speed of rotation as the cam, and wherein the cam is given substantially the same curvature as the inner boundary line 312, the grinding button will be caused to move inwardly and outwardly with respect to the center of the blank so as to grind the distance vision field in conformity with the curvature of the cam, thereby reducing the inner boundary line to the proper curvature.

The invention claimed is:

1. The method of making a one-piece multifocal lens blank consisting in generating on one side of a piece of glass an inner circular vision field, and thereafter simultaneously grinding away the surrounding concentric portion and a part of the inner vision field to form an outer vision field with a non-circular inner boundary line.

2. The method of making a one-piece multifocal lens blank consisting in preserving on one side of a piece of glass an inner circular vision field, simultaneously grinding away the surrounding concentric portion and a part of the inner vision field to form an outer vision field with a non-circular inner boundary line, and thereafter finishing said outer vision field and the remaining non-circular inner vision field.

3. The method of making a one-piece multifocal lens blank consisting in generating on one side of a piece of glass a central inner vision field, generating the surrounding surface of the glass to the desired transverse curvature to provide an outer vision field with a portion thereof substantially merging with a portion of the inner field, and simultaneously with generating the surrounding surface of the glass removing a section of the inner field whereby the generated outer field will extend within the original outline of the inner field.

4. The method of making a one-piece multifocal lens blank consisting in generating on one side of a piece of glass a central circular inner vision field with its surface depressed relative to the surrounding concentric surface of glass, thereafter generating the surrounding surface of the glass to the desired transverse curvature to provide an outer vision field with a portion thereof substantially merging with a portion of the inner field, and simultaneously with generating the surrounding surface of the glass removing a section of the inner field whereby the generated outer field will extend within said circular outline of the inner field.

5. The method of making a one-piece multifocal lens blank consisting in generating on one side of a piece of glass a central inner vision field, associating therewith a flattened cam-like surface, applying a generating tool to said glass having a portion in engagement with said cam-like surface for controlling its movement, and generating the surrounding outer field simultaneously with a part of the inner field to the desired transverse curvature, the path of the generating action being controlled by said cam-like surface.

6. The method of making a one-piece multifocal lens blank consisting in maintaining a non-circular peripheral cam-like surface about the blank, applying a grinding tool to the surface of the blank with said tool in engagement with the cam-like surface for controlling its movement, causing relative movement between the tool and blank in a path defined by said cam-like surface for generating an outer vision field of the prescribed curvature with its inner boundary line conforming substantially to the outline of said cam-like surface, and generating that surface of the blank surrounded by said boundary line to a different prescribed curvature for providing an inner vision field.

7. The method of making a one-piece multifocal lens blank consisting in producing a lens blank having on one side two surface curvatures, an outer vision field and an inner vision field, maintaining a cam in fixed relationship to the lens blank, grinding away a part of the inner field to give it a new outline determined by the shape of the cam and in such a way that the ground area has substantially the same curvature with the outer field, and applying a polishing tool guided by the cam to simultaneously polish the outer field and the newly ground area so that the surface of the newly ground area is polished away until it merges indistinguishably with the outer field.

8. The method of making a one-piece multifocal lens blank consisting in generating on one side of a piece of glass a central circular inner vision field, grinding the edge of said piece of glass to provide a flattened peripheral cam-like surface, applying a generating tool to said glass having a portion in engagement with said cam-like surface for controlling its movement, and thereafter generating the surrounding outer field simultaneously with a part of the inner field to the desired transverse curvature, the path of the generating action being controlled by the cam-like periphery of the glass.

9. The method of making a one-piece multifocal lens blank consisting in grinding the edge of the piece of glass forming said blank to provide a non-circular peripheral cam-like surface, applying a grinding tool to the surface of the glass with said tool in engagement with the cam-like periphery thereof for controlling its movement, causing relative movement between the tool and glass in a path defined by said cam-like surface for generating an outer vision field of the prescribed curvature with its inner boundary line conforming substantially to the outline of said cam-like surface, and thereafter generating that portion of the glass surrounded by said boundary line to a different prescribed curvature for providing an inner vision field.

10. The method of making a one-piece multifocal lens blank consisting in generating on one side of a piece of glass a central circular inner vision field with its surface depressed relative to the surrounding concentric surface of the glass, grinding away a portion of the periphery of the glass to provide a cam-like peripheral surface of a predetermined contour, thereafter generating the surface of glass surrounding the inner field to the desired transverse curvature to provide an outer vision field with a portion thereof substantially merging with a portion of the inner field, and simultaneously with generating the surrounding surface of the glass removing a section of the inner field whereby the outer field will extend within said circular outline of the inner field.

11. A device for generating an outer vision field of a multifocal lens blank having a non-circular inner boundary, said blank having its peripheral edge flattened to provide a guiding cam-like surface substantially conforming to the outline of the desired inner vision field, comprising a generating button adapted to engage the surface of the outer field adjacent the inner field, a follower wheel adapted to engage the cam-like periphery of the blank for guiding said button, and means for supporting said button and follower wheel with their axes of rotation in alignment and extending radially from the axial center of the blank.

12. In a device for generating an outer vision field of a multifocal lens blank having a non-circular inner boundary, the combination with a guiding cam-like surface associated therewith substantially conforming to the outline of the desired inner vision field, of a generating button adapted to engage the surface of the outer field adjacent the inner field of the blank, a follower member adapted to engage said cam-like surface associated with said button for guiding the movement thereof relative to said blank, and means for supporting said button and follower member with their axes of rotation in alignment and extending radially from the axial center of the blank.

13. A device for generating on a multifocal lens blank an outer vision field having an inner boundary line of predetermined form, including a holder for the blank, a generating tool adapted to be applied to the surface of the outer field for generating the same to the desired curvature, means for rapidly rotating said generating tool while moving said tool and blank relative to each other, and a cam cemented upon the blank within and of the same contour as said boundary line adapted to have its cam surface engaged by said tool for positively guiding the tool in the generation of the outer field.

DUDLEY F. TAYLOR.